United States Patent [19]

Jammes et al.

[11] 4,071,840
[45] Jan. 31, 1978

[54] SWITCHING DEVICE FOR REED RELAYS IN A MATRIX

[75] Inventors: Emanuel Marie Augustin Jammes; Jean-Louis Marie Henri Bordier, both of Boulogne, France

[73] Assignee: International Standard Electric Corporation, New York, N.Y.

[21] Appl. No.: 648,433

[22] Filed: Jan. 12, 1976

[51] Int. Cl.² .............................................. H04Q 9/00
[52] U.S. Cl. ............................. 340/166.5; 340/166 R
[58] Field of Search ...................... 340/166 S, 166 R; 335/112, 152; 317/137; 179/18 GE

[56] References Cited

U.S. PATENT DOCUMENTS

| | | | |
|---|---|---|---|
| 3,037,085 | 5/1962 | Lowry | 340/166 S |
| 3,483,516 | 12/1969 | Arndt | 340/166 S |
| 3,518,626 | 6/1970 | Canceill | 340/166 S |
| 3,524,167 | 8/1970 | Regnier | 340/166 S |

Primary Examiner—Harold I. Pitts
Attorney, Agent, or Firm—James B. Raden; Marvin M. Chaban

[57] ABSTRACT

A matrix arrangement is disclosed of bistable, magnetically latched reed relays. Each matrix multiple includes a selection unit comprising a generator for transmitting successive pulses of opposite polarity which switch the relays on that multiple to a first stable condition. The relay coils are arranged so that superimposing the pulses of two multiple selector units switches the corresponding relay or relays to the second stable state.

5 Claims, 16 Drawing Figures

SWITCHING DEVICE FOR REED RELAYS IN A MATRIX

BACKGROUND OF THE INVENTION

1. Field of the Invention

The present invention relates to a switching device in which relays placed in a coordinate arrangement for connecting together transmission lines consisting of at least one wire are fitted with at least one magnet to provide them with two stable states and with control coils connected to selection units each assigned to each coordinate.

2. Description of the Prior Art

Such a device is mentioned in the French Pat. No. 1,316,290. That prior art device uses relays incorporating two coils wound on a glass envelope containing two contact reeds. The disadvantage of that known device resides in the fact that between each switching operation performed between the said lines, an operation is required to release the relays involved in the previous switching operation.

Another device of the same type is described in French Pat. No. 1,393,336 (U.S. Pat. No. 3,524,167 issued Aug. 11, 1970 to A. Regnier et al.) filed by the present applicant. That device also contains relays fitted with two pairs of controlled coils. The advantage of the latter device over that mentioned in U.S. Pat. No. 1,316,290 is that no release operation is required between each switching operation, since operating a relay releases any of the relays on either of the two coordinates defining the operated relay.

SUMMARY OF THE INVENTION

The purpose of the present invention is to provide a device having the same relay-release advantage, while allowing the use of two-coil relays whose positions with respect to the contact reeds are not critical.

For this purpose, a switching device of the type mentioned in the description of the prior art is characterized by the fact that each of the selection units consists of a generator producing at least two successive demagnetization pulses of opposite polarity to position the relays in a first stable state, while the relay coils are arranged so that superimposing the pulses produced by all the selection units places the units in their second stable state.

BRIEF DESCRIPTION OF THE DRAWINGS

The following description enables the invention to be understood, this description being related to the appended drawings, in which.

DESCRIPTION OF A PREFERRED EMBODIMENT

Figure 1:
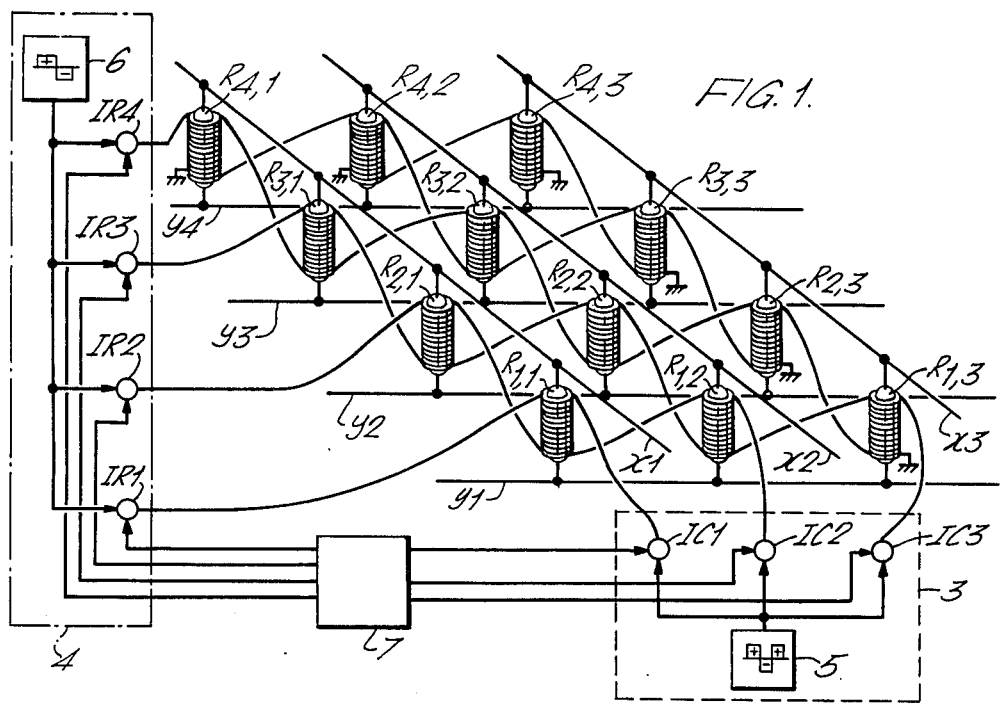
FIG. 1 shows a switching device according to the invention.

In order to simplify the description, the device according to the invention shown in FIG. 1 includes only seven transmission lines, each consisting of one wire. Three of these lines are referenced $x1$, $x2$ and $x3$. These lines have parallel directions, thereby forming a first layer of wires, while lines $y1$, $y2$, $y3$ and $y4$ also parallel to each other, are placed perpendicular to and beneath lines $x1$, $x2$ and $x3$, forming a second layer. Relays R1,1, R1,2, R1,3, R2,1, R2,2, R2,3, R3,1, R3,2, R3,3, R4,1, R4,2 and R4,3, arranged in a two-coordinate pattern, are located between these layers to enable an interconnection of one of the wires of one of these layers with a wire in the other. For example, relay R3,2 can connect wire $y3$ with $x2$.

Figure 2:
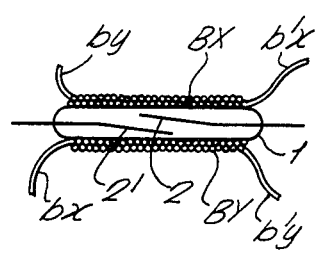
FIG. 2 shows one of the relays forming the device shown in FIG. 1.

FIG. 2 shows an example of a relay which may be used. This relay consists of a glass envelope 1, containing two reeds 2 and 2' of magnetizable material. Two coils BX and BY having the same number of turns are wound directly onto the glass envelope 1, one on top of the other. One of these windings includes connecting ends $bx$ and $b'x$, while the other includes connecting ends $by$ and $b'y$. These relays are operated and released by selection unit 3 and selection unit 4, containing pulse generators 5 and 6 respectively, these pulse generators being connected to coils BX and BY of the relays via voltage-controlled switches. Coils BX of relays R1,1, R2,1, R3,1 and R4,1 are connected in series to generator 5 via the voltage-controlled switch IC1. Coils BX of relays R1,2, R2,2, R3,2 and R4,2 are connected to this same generator by switch IC2, while the coils BX of R1,3, R2,3, R3,3 and R43 are connected by IC3. Coils BY of relays R1,1, R1,2 and R1,3 are connected in series to generator 6 via the voltage-controlled switch IR1. The coils BY of relays R2,1, R2,2 and R2,3 are connected by IR2, while those of relays R3,1, R3,2 and R3,3 are connected by IR3 and those of relays R4,1, R42 and R4,3 by IR4.

Figure 3A:
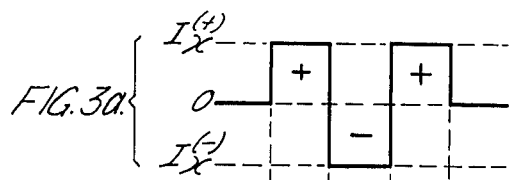
FIG. 3a, 3b and 3c depict the shapes of the pulses produced by selection units.
Figure 3B:
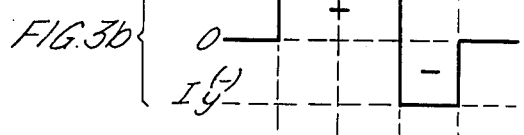

According to the invention, the switching device is characterized by the fact that each of the selection units 3 and 4 consists of a generator (5 and 6, respectively) of at least two successive demagnetization pulses. An example of the pulse shapes produced by generators 5 and 6 is shown in FIGS. 3a and 3b. The pulse currents applied to the relays demagnetize the reeds, placing the relays in their first stable state. The control coils arranged as illustrated in FIG. 2 enable the magnetic field pulses produced by the output current pulses of generators 5 and 6 to be superimposed or added. The pulse formed by superimposing the pulses shown in FIGS. 3a and 3b is shown in FIG. 3c.

Figure 3C:
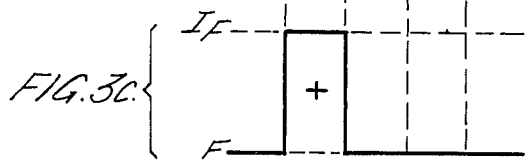

The amplitude of the pulse shown in FIG. 3C is such that the relay where superimposition occurs is placed in its second stable state.

The switching device according to the invention is explained in detail in the following.

It should be recalled first that in order to close a relay of the type shown in FIG. 2, a magnetic field of sufficient strength is required, such that reeds 2 and 2' are attracted together. For this purpose, the material constituting reeds 2 and 2' are magnetized by a current pulse applied to coils BX or BY. This current pulse, for a certain relay for example, should be capable of producing a field H around the reeds of strength in excess of $I_f$ (see FIG. 4).

In order to open the relay, the reeds must be demagnetized. This is performed by a current pulse of opposite direction to that which closed the relay and which produces a field H of strength less than a value $-I_o$ but greater than $-I_f$ (otherwise the relay closes again).

In practice, it is virtually impossible to obtain relays for which the values of $I_f$ and $I_o$ are strictly the same, these values being spread over a tolerance range. $I_f$ and $I_o$ therefore lie within intervals $\Delta I_f$ and $\Delta I_o$ respectively, the first of these intervals being defined by $I_{f1}$ and $I_{f2}$, and the second by $-I_{o1}$ and $-I_{o2}$. These same intervals are again found in symmetrical positions on the other side of 0.

In the example described, the relays are closed by positive pulses.

In order to close all relays, the strength of this operating field $I_F$ must be greater than $I_{f2}$, i.e.:

$$I_F > I_{f2} \qquad (1)$$

This operating field $I_F$ is obtained by superimposing fields $I^{(+)}_x$ and $I^{(+)}_y$ created by coils BX and BY energized by the current pulses produced by generators 4 and 5. Assuming that fields $I^{(+)}_x$ and $I^{(+)}_y$ are equal, then:

$$I_F = I^{(+)}_x + I^{(+)}_y = 2 I^{(+)}_x \qquad (2)$$

The current pulses produced by generators 4 and 5 should release all relays where no superimposition occurs. Release is caused by negative values $I^{(-)}_x$ and $I_{(-)y}$, which are also assumed to be equal. These values $I^{(-)}_x$ and $I^{(-)}_y$ should be such that:

$$-I_{f1} < I^{(-)}_x < -I_{o2} \qquad (3)$$

If $I^{(-)}_x < -I_{o2}$, the pulse amplitude is insufficient for demagnetizing the reeds, with the result that the relay does not release. If $I^{(-)}_x < -I_{f1}$, the amplitude is too large, causing magnetization in the other direction, and the relays operate.

Assume, for example, it is required to connect line $y2$ with $x3$ (FIG. 1). The central unit 7 closes switches IR2 aND IC3, leaving the others open. Relays R2,1 and R2,2 are subjected to the excitation fields whose shapes are shown in FIG. 3b. Independent of their initial states, these relays will be released. The same occurs for relays R1,3, R3,3 and R4,3. These fields are superimposed only in relay R2,3, which closes, connecting line $y2$ with line $x3$.

Other pulse shapes are appropriate for performing the above functions.

Figure 5A:
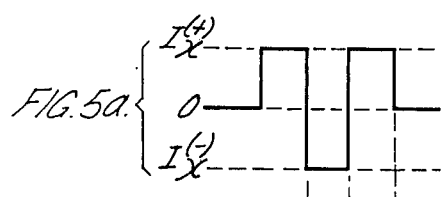
FIGS. 5a, 5b and 5c show second examples of pulse shapes suitable for a device according to the invention.
Figure 5B:
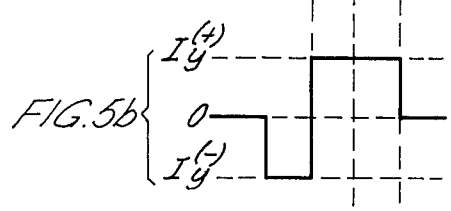
Figure 5C:
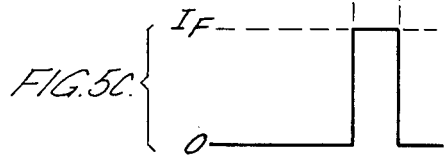

With the pulses shown in FIGS. 5a, 5b and 5c, it is thus possible to obtain release of the relays before that in which superimposition occurs closes.

Figure 6A:
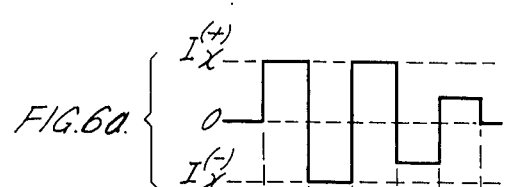
FIGS. 6a, 6b and 6c show third examples of pulse shapes suitable for a device according to the invention.
Figure 6B:
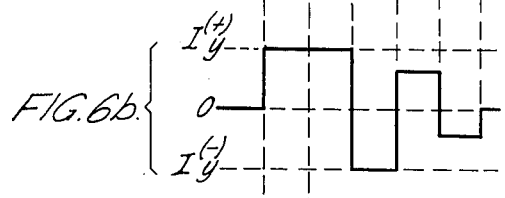
Figure 6C:
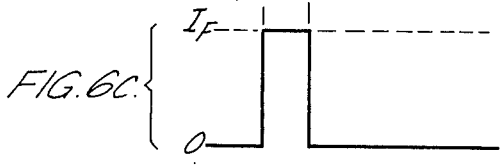

In FIGS. 6a, 6b and 6c, the pulses have decreasing values from a value producing excitations $I^{(+)}_x$ and $I^{(-)}_x$. Ths produces more thorough demagnetization.

Figure 7A:
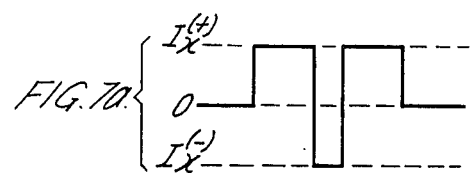
FIGS. 7a, 7b and 7c show fourth examples of pulse shapes suitable for a device according to the invention.
Figure 7B:
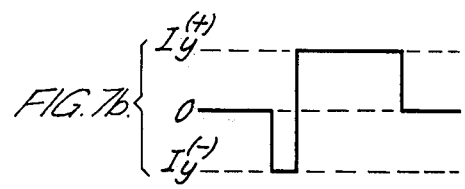
Figure 7C:
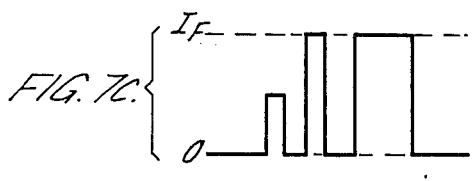

Because of propagation times, fields may not be exactly superimposed, and fields may then appear in the wrong direction, capable of causing relays to release incorrectly. For these reasons, the pulses producing fields $I^{(+)}_x$ and $I^{(+)}_y$ are made sensibly wider than that producing fields $I^{(-)}_x$ and $I^{(-)}_y$, as shown in FIGS. 7a and 7b. Superimposing these fields produces a total field whose shape is shown in FIG. 7c. It is seen that additional pulses are produced, but these are of the same polarity and at least one of these pulses produces an excitation field $I_F$. Operation is therefore not modified and a shift in time of the pulses whose shapes are shown in FIGS. 7a and 7b merely changes the pulse width shown in FIG. 7c.

It will be seen that the relay shown in FIG. 2 may be fitted with a former wound with the coils and slid onto envelope 1. It is also possible to wind the coils simultaneously, i.e. with two wires at the same time.

Figure 8:
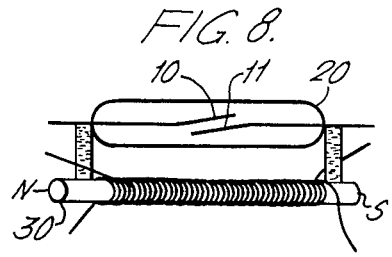
FIG. 8 shows another type of relay which may be used in a device according to the invention.

It is also possible to use a relay of the type illustrated by FIG. 8.

In this case, the contact reeds 10 and 11 are of non-remanent material and enclosed in a glass envelope 20. The coils BX' and BY' are wound on a bar-magnet 30, whose N and S poles are aligned in a direction practically parallel with that of reeds 10 and 11.

Figure 4:
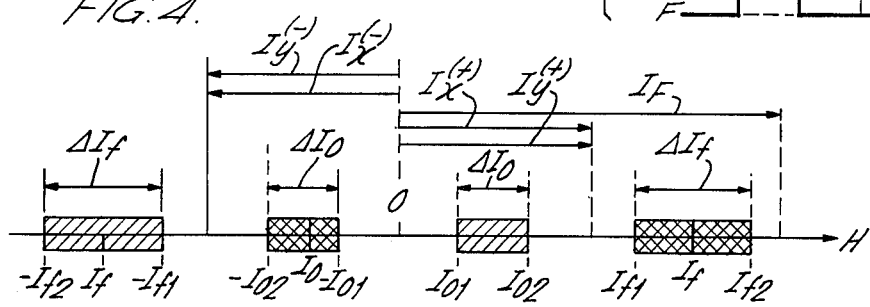
FIG. 4 shows the operating and release characteristics of the relays used in the device according to the invention.

It may also be seen that the operating characteristics of relays such as those shown in FIG. 4 can be modified as a function of the pulse widths, allowing a greater choice of both positive and negative pulse amplitudes.

Although the principles of the present invention are described above in relation with specific practical examples, it should be clearly understood that the said description is given as an example only and does not limit the scope of the invention.

We claim:

1. A switching matrix comprised of a plurality of crosspoints at the intersection of columns and rows conductors, each of said crosspoints comprising a magnetically latched reed relay having a columns conductor coil and a row conductor coil, each of said relays being switchable to an operated condition with its coils energized to add the strengths of the respective coil fields, and to the release condition with its coils energized subtractively and the coil of greater strength energized in a relay demagnetizing direction, a sequential pulse generator for each said columns conductor and a sequential pulse generator for each said rows conductor, means for selecting one of said columns generators and one of said rows generators to energize one or more coils of the selected relay at the intersection of the selected column and row, said generators operative through a relay release cycle of emitting pulses to energize the selected relay coils subtractively and for reversing the direction of the pulses of current flow in both coils to cause said coils to be energized subtractively once again.

2. A matrix as claimed in claim 1, in which the two coils on each relay are of approximately equal field strength.

3. A matrix as claimed in claim 1, in which each relay includes a glass envelope surrounding the relay reeds and the coils are wound on said glass envelope.

4. A matrix as claimed in claim 3, in which said reeds are fabricated from a magnetically retentive material.

5. A matrix as claimed in claim 2, in which each relay includes a glass envelope surrounding said reeds, and a bar magnet with poles aligned in a direction substantially parallel with the extent of said reeds.

* * * * *